US012117120B2

(12) United States Patent
Rohskopf et al.

(10) Patent No.: US 12,117,120 B2
(45) Date of Patent: *Oct. 15, 2024

(54) EXHAUST PIPE ACCESSORY AND USES THEREOF

(71) Applicant: Jeremias Inc., Marietta, GA (US)

(72) Inventors: Larry Rohskopf, Roswell, GA (US); Matthew Bertler, Marietta, GA (US); Clark E. Pridemore, Woodstock, GA (US); Francois Sauve, Marietta, GA (US); David Richards, Marietta, GA (US)

(73) Assignee: Jeremias Inc., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,853

(22) Filed: Jul. 17, 2023

(65) Prior Publication Data

US 2024/0060579 A1  Feb. 22, 2024

Related U.S. Application Data

(63) Continuation of application No. 17/477,431, filed on Sep. 16, 2021, now Pat. No. 11,703,155.

(60) Provisional application No. 63/081,099, filed on Sep. 21, 2020.

(51) Int. Cl.
  *F16L 9/18* (2006.01)
  *F16L 9/04* (2006.01)
  *F16L 3/08* (2006.01)

(52) U.S. Cl.
  CPC ............... *F16L 9/18* (2013.01); *F16L 9/04* (2013.01); *F16L 3/08* (2013.01)

(58) Field of Classification Search
  CPC ....... F16L 9/18; F16L 3/08; F16L 3/10; F16L 5/00
  USPC .......................................... 138/112–114, 148
  See application file for complete search history.

(56) References Cited

U.S. PATENT DOCUMENTS

| 2,056,840 | A | * | 10/1936 | Collom | ................... F01N 13/08 138/135 |
| 3,286,015 | A | * | 11/1966 | Hildebrand | ........ H01B 11/1847 174/99 R |
| 3,711,050 | A | | 1/1973 | Case | |
| 4,896,701 | A | | 1/1990 | Young | |
| 5,303,744 | A | | 4/1994 | Eriksson | |
| 5,803,127 | A | * | 9/1998 | Rains | ........................ F16L 7/00 138/148 |
| 6,158,475 | A | * | 12/2000 | Clemmer | .................. F16L 7/00 138/108 |
| 6,186,452 | B1 | | 2/2001 | Zearbaugh et al. | |
| 6,896,004 | B1 | * | 5/2005 | Witzel | ....................... F16L 7/00 138/108 |
| 8,453,680 | B2 | | 6/2013 | Weiss et al. | |

(Continued)

FOREIGN PATENT DOCUMENTS

| CN | 110748705 A | 2/2020 |
| CN | 210624651 U | 5/2020 |

OTHER PUBLICATIONS

International Search Report and Written Opinion issued in PCT/US2021/050745, mailed Dec. 22, 2021.

*Primary Examiner* — Patrick F Brinson
(74) *Attorney, Agent, or Firm* — Arnall Golden Gregory LLP

(57) ABSTRACT

Products and methods for providing structural strength and form support to ventilation pipes.

21 Claims, 4 Drawing Sheets

(56) References Cited

U.S. PATENT DOCUMENTS

| | | |
|---|---|---|
| 2010/0021795 A1 | 1/2010 | Takeshita et al. |
| 2013/0168129 A1 | 7/2013 | Cox et al. |
| 2016/0215978 A1 | 7/2016 | Bertler et al. |
| 2017/0207615 A1 | 7/2017 | Trapassi et al. |
| 2022/0090710 A1 | 3/2022 | Rohskopf et al. |
| 2022/0322578 A1 | 10/2022 | Geng et al. |

\* cited by examiner

EXHAUST PIPE ACCESSORY AND USES THEREOF

CROSS-REFERENCE TO RELATED APPLICATIONS

This application is a Continuation of U.S. application Ser. No. 17/477,431 filed Sep. 16, 2021, which claims the benefit of U.S. Provisional Application No. 63/081,099 filed Sep. 21, 2020. The entire contents of each of which are incorporated herein by reference in their entirety.

BACKGROUND OF THE INVENTION

Field of Invention

This application relates generally to exhaust systems utilized in commercial environments, building and structure heating, oil-burning and fossil fuel-burning environments; and more specifically related to fire-rated, commercial kitchen exhaust ventilation systems and building heating exhaust ventilation systems.

Description of Related Art

Ventilating a commercial kitchen environment for workers is paramount for safety reasons. To ensure safety, businesses employ commercial kitchen exhaust removal systems. These systems can entail multiple ventilation hoods or components through which the potentially dangerous fumes, gases and aromatic odors are pulled into the exhaust systems and vented away from the cooking environment in a safe and proficient manner, while also ensuring fresh air (air turnover) is pulled into the environment. For example, grease vapors, heat plumes, and other by-products of combustion are emitted from cooking surfaces and rise and/or are drawn into the exhaust system.

While these exhaust ventilation systems are important safety features for commercial kitchens and large scale cooking facilities, exhaust removal systems are relevant to safety in many areas of business and life, for example: commercial grease duct systems in restaurants, athletic facilities, schools, training facilities, hospitals, etc.; and in pizza oven chimney and grease duct systems; stand-alone restaurant exhaust systems; and commercial dishwasher exhaust systems. These systems can be anything from simple and relatively short length systems to complex, large scale systems navigating internal structures of buildings or homes, and even including hundreds of yards of duct work or pipes, which can run separately or intertwining through to exterior, e.g., roof, outlets. These systems can include many components from weather heads, fans and adapters, storm collars, roof flashing, flange collars and adapters, grease tee caps and access, varying lengths of piping with elbows and support collars, and plate supports. Due to the toxic nature of the gases, grease fumes and other particles within the heating plumes, these exhaust ventilation systems require proper and sound fitting and construction. From small projects to large scale projects, fitting and piecing the structures and components together can require significant time and resources.

Given the safety concerns, regulations and standards to be met by the structures, there is a need for ways to add structural strength to ventilation piping/conduits, while also ensuring form support, which also apply to single wall and double wall exhaust systems.

SUMMARY OF INVENTION

The present invention provides embodiments of an assembly for increasing structural strength and form support for exhaust pipes. Embodiments of the invention provide an exhaust pipe accessory of a given material that is securely mated about the outer circumference of an exhaust pipe to form an assembly of the invention. In certain embodiments the accessory has an outer diameter that is greater than the outer diameter of the exhaust pipe. Some embodiments provide ratios between the outer diameter of the accessory and the outer diameter of the exhaust pipe. Various other embodiments provide assemblies for single-wall exhaust pipes, while certain embodiments provide assemblies for double-wall exhaust pipes. In yet other embodiments, methods of making the assemblies is provided. Certain embodiments provide methods of using the assemblies in exhaust systems.

Additional features, advantages, and embodiments of the invention may be set forth or apparent from consideration of the following detailed description, drawings, and claims. It is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in, and constitute a part of, this specification, illustrate preferred embodiments of the invention and together with the detail description serve to explain the principles of the invention. In the drawings.

DETAILED DESCRIPTION OF THE INVENTION

Provided herein is a pipe and accessory assembly for use in installation of exhaust pipe conduit systems. As will be appreciated, the pipe and accessory assembly of the invention can be used in multiple exhaust pipe conduit systems, including, for example, commercial kitchens, commercial grease duct systems, chimneys, various flues, stand-alone restaurants, commercial dishwasher systems, commercial drying systems, and other related systems requiring adequate ventilation of various environments.

As used herein, various terms are applicable, and interchangeable where specified. The term "accessory" is interchangeable with such terms as "pipe accessory", "conduit accessory", "flue pipe accessory", "flue gas conveying accessory", "gas conveying element accessory", "exhaust pipe accessory", and "exhaust pipe conduit accessory." Also as used herein, the term "connector" is interchangeable with the terms, such as "connection", "accessory connector", "accessory connection", and "affixing element." The use of the term "pipe" is interchangeable with the terms "conduit", "gas conveying conduit", "gas conveying element", "gas conduit", "flue pipe", "flue pipe conduit", "flue pipe", "exhaust pipe", "exhaust pipe conduit", and "exhaust conduit." The term "first end" is interchangeable with the terms "tab connector", and "male end." The term "second end" is interchangeable with the terms "receiving end", "slot connector", "expanded socket", and "female end." As will be appreciated, these terms may be conveyed through other derivatives, e.g., singular and plural forms, and other terms of art as they would reference the various aspects of the described invention.

Figure 1:
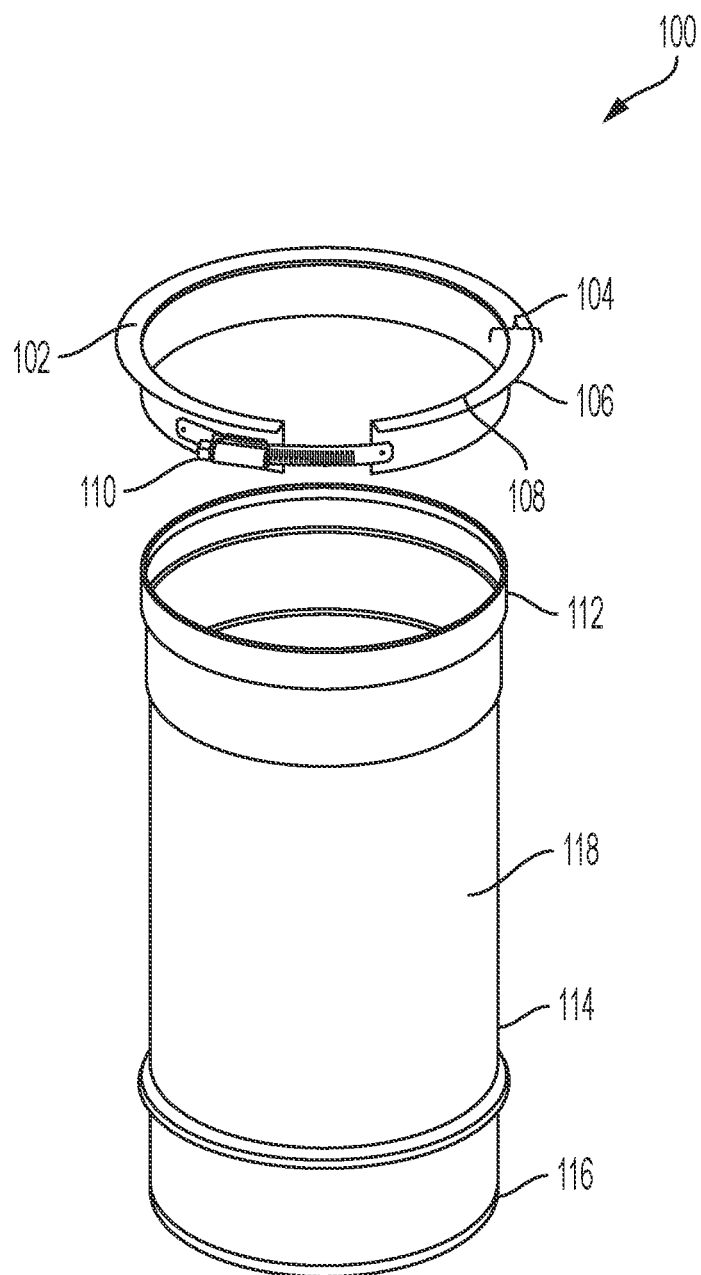
FIG. 1 is a side view of certain components of a single-wall pipe and accessory assembly according to the principles of the invention.

As seen in FIG. 1, a pipe and accessory assembly 100 (also referred to as assembly 100) is shown in one embodiment of the invention. Assembly 100 combines pipe accessory 102 with pipe 114, wherein pipe accessory 102 is mated with pipe 114. Accessory 102 can be mated to pipe 114 in different ways by different means known in the art. For example, accessory 102 can have connector 110. Connector 110 can be a tightening element, for example, such as a worm gear connection, bolt and nut hardware and the like. Connector 110 can also include other known methods, such as a weld (e.g., MIG, TIG, Arc, gas, spot, seam and brazing), clinching, rivets (e.g., solid or round, semi-tubular, Oscar, blind or pop, drive, and flush type), folding or tab joints, adhesive bonding, and screws (e.g., machine, self-tapping) or other similar means of achieving connector 110.

Pipe accessory 102 is provided with an accessory outer diameter 106 and an accessory inner diameter 108. These diameters provide an accessory thickness 104. When accessory outer diameter 106 is in a specific ratio with pipe outer diameter 118, then there is significant improvement in structural strength and support of form (e.g., generally circular as would be defined by the skilled artisan) related to pipe and accessory assembly 100. This significant improvement provides unexpected integrity of assembly 100 and the fluid system as a whole. The ratio range and specifics were developed to maximum the desired structural strength and support of form. Through experimentation, the inventors were able to achieve these goals by dividing accessory outer diameter 106 by pipe outer diameter 118 resulting in the optimum ratios for the invention. The ratio for a specific sized pipe 114 to a specific sized pipe accessory 102 is between about 1.000 and about 1.500; and preferably between about 1.004 and about 1.429; and specific ratios incrementally within these ranges. While these ratios are provided with lower and upper ranges, ratios within these ranges of the invention can be calculated based on sizes of standard pipes 114 with known diameters, and for customized pipes 114 addressing specific modifications to meet requirements of different projects.

The following Table 1 illustrates examples of the invention:

| Accessory Outer Diameter 106 | Pipe Outer Diameter 118 | Ratio Accessory/Pipe |
|---|---|---|
| 8.125 | 8 | 1.016 |
| 14.125 | 14 | 1.009 |
| 20.125 | 20 | 1.006 |
| 26.125 | 26 | 1.005 |
| 32.125 | 32 | 1.004 |
| 14 | 8 | 1.750 |
| 20 | 14 | 1.429 |
| 26 | 20 | 1.300 |

-continued

| Accessory Outer Diameter 106 | Pipe Outer Diameter 118 | Ratio Accessory/Pipe |
|---|---|---|
| 32 | 26 | 1.231 |
| 38 | 32 | 1.188 |

In other aspects of the invention, a ratio can be between about 1.000 and about 1.750, as relates to the above ratio ranges. The significance of these ratios to the structural strength and support of form is independent of any components or mechanisms used for joint affixing or fastening of one or more pipes 114. This is more clearly explained in relation to placement of accessory 102 of the pipe and accessory assembly 100.

Without deviating from the ratio requirements, the shape of accessory 102 can be varied as desired, required and/or manufactured. As seen in FIG. 1, accessory 102 is generally with an "L" shape, forming a flange. Other geometric shapes can be employed, for example, "T" shaped, ring shaped, oval shaped, or generally circular, with the understanding that the geometric shape is less important than accessory thickness 104 and the ratio resulting from accessory thickness 104, as it relates to the ratio of accessory outer diameter 106 and pipe outer diameter. As an inventive variable, importance is placed on any accessory outer diameter 106, regardless of shape or profile, as long as the accessory outer diameter 106 of accessory 102 complies with the dimensional data provided herein. Deviating from the ratios significantly diminishes the structural strength, support of form, and workability of pipe 114.

Materials chosen for fabrication and manufacturing of accessory 102 are those metal materials known in the art that allow flexibility of accessory 102 to be manipulated around and affixed to pipe 114, as discussed herein. Thus, the material making accessory 102 is such that accessory 102 can be opened, stretched and/or wrapped around a circumference of pipe 114, to then be securely affixed to provide strength and form as desired. Examples of material types to be used with the invention, include, for example, stainless steel (e.g., 304ss, 316ss, 409ss, 430ss, 444ss), as well as Galvanized and Aluminized steel. Examples of the gauges of materials to be used in the invention include, for example, those selected from 8, 9, 10, 11, 12, 13, 14, 15, 16, 17, 18, 19, 20, 21, 22, 23, 24, 25, 26, 27, and 28; more preferably a range of 10 gauge to 24 gauge; even more preferred a range of 10 gauge to 20 gauge; and most preferred a range of 10 gauge to 16 gauge. For example, one gauge of material used in the invention can be 16 gauge stainless steel, Galvanized steel and/or Aluminized steel. As will be appreciated by the skilled artisan, the gauge of the material can be determined based on the requirements of the job, as well as other factors such as economics, resource availability and project/standards requirements.

Depending on factors, including for example, the project requirements, structure, size of appliances (e.g., heating/cooling, kitchen, drying), there can be many sections of pipe 114 of varying sizes and lengths to a given ventilation system, such as those used for commercial kitchens, laundry dryers, chimneys, fireplaces, vents, and solid or fossil fuel-burning appliances and facilities. While standard pipe 114 lengths would be known by the skilled artisan, the longest standard length is 4 feet; however there can be custom scenarios that require longer pipe 114 lengths to fulfill the requirements of the project. For example, the pipes 114 can be 8 feet or more, or 8 feet or less. If a pipe 114 requires larger diameters, then the pipes 114 are shorter in length for purposes of the invention, e.g., larger diameter pipe 114 can require pipe 114 lengths to be a maximum of 3 feet. As will be appreciated by the skilled artisan, larger diameter pipes 114 are more susceptible to losing the required form, e.g., generally circular, and can become ovalized, which is unwanted. The larger size and heavier weight makes the pipes 114 more difficult to manage and manipulate, and thus, shorter lengths are preferred.

The pipes 114 must be connected together in a safe and compliant manner. For example, a flue gas conveying element 114 can be in many sections of pipes 114, wherein each pipe 114 must be connected to the preceding pipe 114 in a manner that safely and effectively permits toxic compounds, gases, etc. to pass through the flue. Placement and mating of each pipe 114 can be cumbersome, which leads to loss of assembly time and can lead to damaged portions of pipe 114. Damaging portions of pipe 114 can lead to inefficient ventilation, creating potentially hazardous working environments, e.g., commercial kitchens. As demonstrated by the instant invention, this concern is addressed through the pipe and accessory assembly 100.

By following the proper ratio calculations discussed herein and affixing accessory 102 to an exterior of pipe 114, the pipe 114 is forced into a more rigid, less cumbersome component to work with, and allowing further design enhancements of the exhaust system (e.g., flue gas conveying system). Accessory 102 is secured around a circumference of pipe 114. Depending on various factors of the project (e.g., the length and/or shape of pipe 114), one or more accessories 102 can be secured around a circumference of pipe 114 to cause stiffening, leading to increased strength, form support, and a reduction in time and resources spent on assembly of the ventilation system. As discussed herein, pipe accessory 102 is not for affixing ends of components to pipes or securing joints and the like. Pipe accessory 102 is intended for significantly increases structural strength and supporting the desired form of the pipe 114. These benefits improve the workability of pipe 114 for connecting with other pipes 114 or other components of the ventilation system. By way of example, pipe 114 in FIG. 2 has a first end 116 and a second end 112. With a first pipe 114 positioned, a second pipe 114 is positioned for fluid connection with the first pipe 114. For example, with both pipes 114 comprising their respective accessory 102 and the first pipe 114 positioned as the starting point for adding lengths of pipes 114, a second pipe 114 is positioned with its first end 116 in line with a second end 112 of the first pipe 114. The first end 116 of second pipe 114 is inserted into the second end 112 of the first pipe 114, with enough directional (downwardly, laterally, angled, etc.) force until the first end 116 of the second pipe 114 fittedly locks (e.g., locking teeth snap-lock) into place on the first pipe 114, ensuring the inner wall is mated together properly with the previous section or pipe 114 and that all locking means (e.g., snap-lock teeth) are securely locked together. Whether pipes 114 are successively mated or whether a joint connection or bend (e.g., adjustable elbow) is positioned intermittently between pipes 114, the function of pipe and accessory assembly 100 remains unchanged when the dimensional data and ratios are applied correctly. Accessory 102 provides the structural support and form support through applying and following the required ratios.

Figure 2:
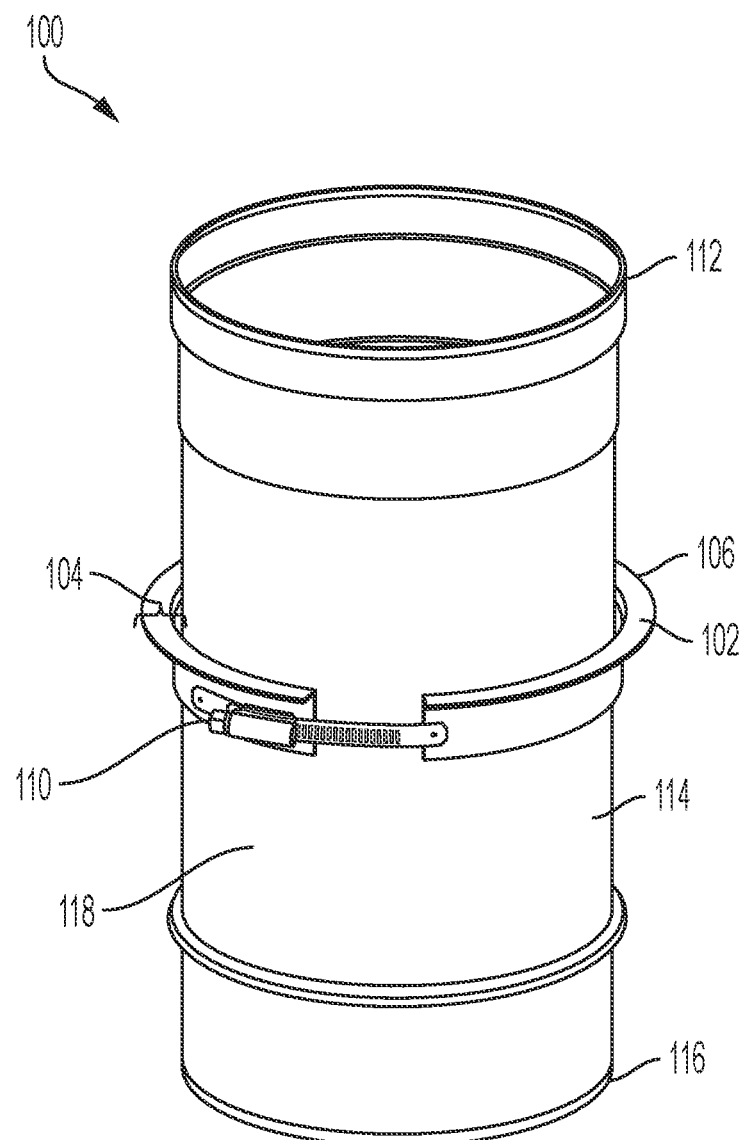
FIG. 2 is a side view of the certain components of FIG. 1 in one aspect of assembly according to the principles of the invention.

In FIG. 2, pipe and accessory assembly 100 is illustrated in the assembled form, wherein accessory 102 is applied to the pipe 114 with connector 110 engaged. In this assembled form, pipe 114 is significantly strengthened and has the supported form desired for the project. In FIGS. 1-2, accessory 102 is oriented with accessory thickness 104 toward a second end 112 of pipe 114; however, this orientation is illustrative only because the orientation is no relevant. Regardless of orientation of accessory 102 relating to one or more ends of pipe 114, it is paramount that accessory thickness comply with the ratio requirements as described herein. As described herein, the geometrical shape of accessory 102 is not the significant requirement; however, the shape of accessory 102 is not to interfere with the ratio requirements to meet the scope of the invention. As discussed herein and depending on the project requirements, one or more accessories 102 can be utilized with any given or specified length of pipe 114. Placement of the one or more accessories 102 is dependent upon the needs of the project, diameter and length of pipe 114 being utilized.

Figure 3:
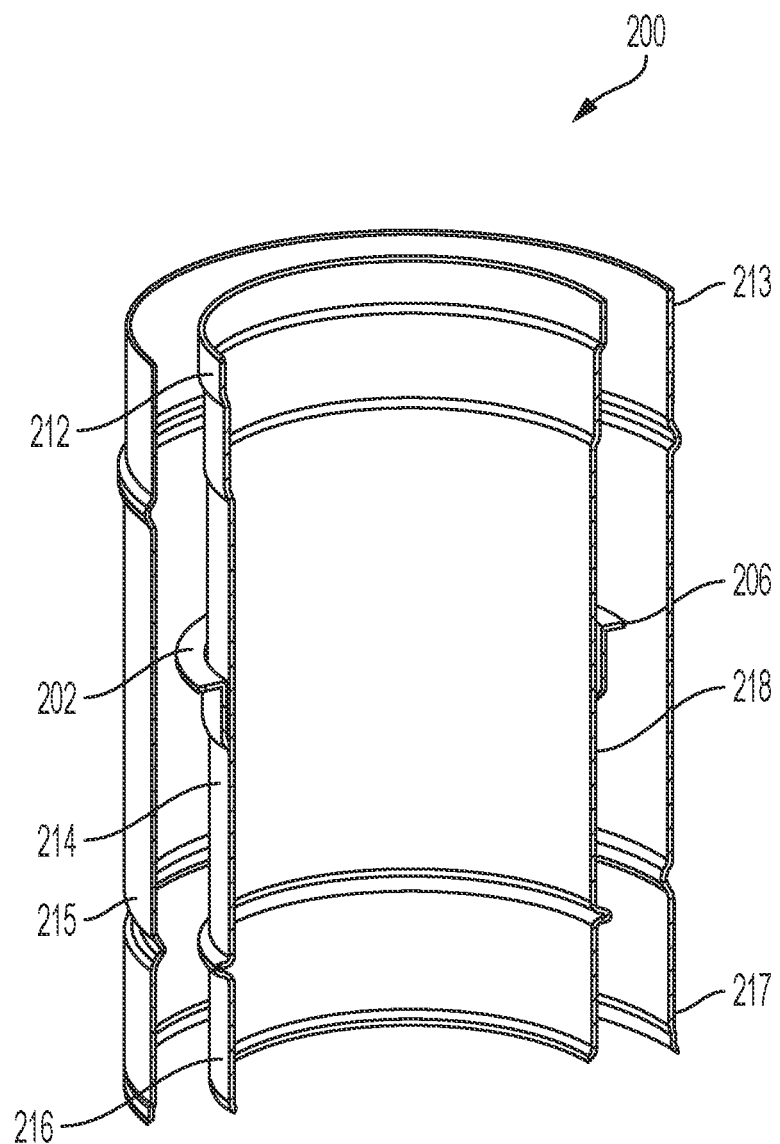
FIG. 3 is a cross-sectional view of a double-wall pipe and accessory assembly of a second embodiment according to the principles of the invention.
Figure 4:
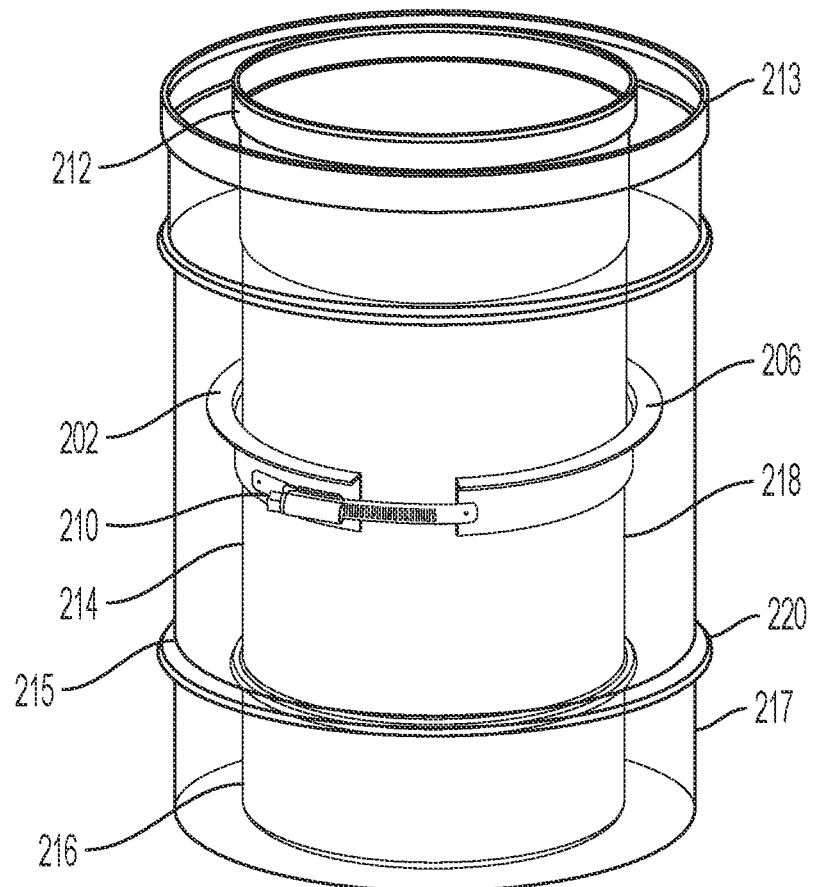
FIG. 4 is a non-cross sectional view of the assembly of FIG. 3 according to the principles of the invention.

Pipe and accessory assembly 100 of FIGS. 1-2 illustrate a single-wall pipe 114 with accessory 102; however, the principles applied to a pipe and accessory assembly 100 with a single-wall pipe 114 and accessory 102 are also applicable to an alternative embodiment of the invention, which is double-wall pipe and accessory assembly 200 of FIGS. 3-4. The double-wall pipe and accessory assembly 200 (also referred to herein as "double-wall assembly 200") of FIGS. 3-4 illustrates inner wall accessory 202 affixed about a circumference of inner wall pipe 214, which is positioned within an internal space of an outer wall pipe 215.

FIG. 3 provides a cross section of double-wall pipe and accessory assembly 200. Assembly 200 utilizes an inner wall pipe 214 having an inner wall pipe outer diameter 218. Inner wall accessory 202 is secured around an outside circumference of inner wall pipe 214; thereby, providing structural strength and form support, as described and applied in pipe and accessory assembly 100 of FIGS. 1-2. The ratios applied to pipe and accessory assembly 100, also apply to the double-wall pipe and accessory assembly of FIGS. 3-4. By adhering to the dimensional requires of the ratios, Inner wall 214 and inner wall accessory 202 fit within the internal space of outer wall pipe 215 with reduced labor time and reduced chances of damage to the system. Also, by adhering to the dimensional requirements of the invention, there is significant reduction and/or elimination of impediments by or destruction to outer wall pipe 215 and any insulation within the internal space of outer wall pipe 215. This is a significant benefit over other practiced methods of assembly and use of a double-wall pipe.

Double wall assembly 200 has outer wall pipe 215, which has an outer wall first end 217 and an outer wall second end 213, designed for mated coupling with other double wall pipe and accessory assemblies. Double wall assembly 200 utilizes inner wall pipe 214, which has an inner wall first end 216 and an inner wall second end 212. As discussed, inner wall pipe 214 has inner wall accessory 202 secured about the outer circumference of inner wall pipe 214. Inner wall accessory 202 has inner wall accessory outer diameter 206 (also referred to as "outer diameter 206"). To meet the dimensional requirements of the ratios presented in Table 1 above, the measurement of inner wall accessory outer diameter 206 is divided by the measurement of the inner wall pipe outer diameter 218. It will be understood by the skilled artisan that the materials to be used, lengths and diameters to be used and project requirements will influence the required ratio that is within this invention. As provided herein, it is the thickness of inner wall accessory 202 in relation to the inner wall pipe outer diameter that determines the efficacy and efficiency of assembly 200; not necessarily the geometrical shape of inner wall accessory 202.

During construction of the full ventilation pipe system, assemblies 200 are mated by aligning the inner wall second end 212 and outer wall second end 213 with the inner wall first end 216 and the outer wall second end 217, and applying sufficient pressure to securely connect the opposing ends of each assembly 200. This is repeated for each additional assembly 200 added to the project, but also could include securely connecting a pipe and accessory assembly 100 (a single-wall assembly), wherein assembly 200 would be securely connected to assembly 100 through the mated connection between inner wall pipe 214 of assembly 200 and the pipe 114 of assembly 100. This will be appreciated by the skilled artisan. FIG. 4 is a non-cross section view of assembly 200, as described herein.

The products and methods of the invention are compliant with known UL standards of the industry, e.g., UL-1978 Standard, Grease Duct; UL-103 Standard, Building Heating Appliance Chimney; UL-2561 Standard, 1400F Chimney Listing; and UL-1738 Standard for Venting Systems for Gas-Burning Appliances. The products and methods of the invention are also industry Code compliant with the National Fire Protection Association (NFPA), e.g., NFPA 96: Standard For Ventilation Control And Fire Protection Of Commercial Cooking Operations; NFPA 211: Standard for Chimneys, Fireplaces, Vents, and Solid Fuel-Burning Appliances; NFPA 54: National Fuel Gas Code; NFPA 31: Standard for the Installation of Oil-Burning Equipment; and NFPA 37: Standard for the Installation and Use of Stationary Combustion Engines and Gas Turbines. The products and methods of the invention are also compliant with the CSA B149: Natural Gas and Propane Installation Code, and the International Mechanical Code.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. An exhaust pipe and accessory assembly comprising:
   an exhaust pipe having an outer diameter, wherein the exhaust pipe is tubular in length and shape, and has a circular circumference; and
   an accessory securely mated around the outer diameter of the exhaust pipe,
   wherein the accessory includes a flange defining an accessory thickness from an inner diameter of the accessory to an outer diameter of the accessory, and
   wherein the outer diameter of the accessory is greater than the outer diameter of the exhaust pipe, and
   wherein a portion of the flange includes an "L" shape cross-sectional profile, a first portion of the "L" shape cross-sectional profile defining the accessory thickness, extending from the inner diameter of the accessory to the outer diameter of the accessory and a second portion of the "L" shape cross-sectional profile extending from an inner diameter of the first portion in a direction of the length of the exhaust pipe.

2. An exhaust pipe and accessory assembly comprising:
   an exhaust pipe having an outer diameter, wherein the exhaust pipe is tubular in length and shape, and has a circular circumference; and
   an accessory securely mated around the outer diameter of the exhaust pipe,
   wherein the accessory includes a flange defining an accessory thickness from an inner diameter of the accessory to an outer diameter of the accessory, and
   wherein the outer diameter of the accessory is greater than the outer diameter of the exhaust pipe, and
   wherein the outer diameter of the accessory and the outer diameter of the exhaust pipe are in a ratio in a range of about 1.0000 to about 1.5000.

3. The assembly of claim 2, wherein the ratio is in a range of about 1.0040 and about 1.4290.

4. The assembly of claim 3, wherein the ratio is in a range of about 1.0040 and about 1.195.

5. The assembly of claim 1, wherein the assembly is a single-wall exhaust pipe assembly.

6. The assembly of claim 1, wherein the assembly is a double-wall exhaust pipe assembly.

7. The assembly of claim 1, wherein the accessory is a metal.

8. The assembly of claim 7, wherein the metal is one of stainless steel, galvanized steel, and aluminized steel.

9. The assembly of claim 8, wherein the stainless steel is one of 304ss, 316ss, 409ss, 430ss, and 444ss.

10. The assembly of claim 7, wherein the metal thickness is 24 gauge or 16 gauge.

11. The assembly of claim 7, wherein the metal thickness is 16 gauge.

12. The assembly of claim 1, wherein the accessory is securely mated around the outer diameter of the exhaust pipe by a worm gear connection, bolt and nut hardware, a weld, clinching, rivets, folding or tab joints, adhesive bonding, screws or other similar means.

13. The assembly of claim 1, wherein the accessory is not a fastening or securing element for joints or other components of an exhaust system.

14. The assembly of claim 1, wherein the accessory adds structural strength and form support to the exhaust pipe.

15. The assembly of claim 6, wherein the double-wall exhaust pipe assembly includes the exhaust pipe and a second exhaust pipe,
   wherein the second exhaust pipe has a second outer diameter, is tubular in length and shape, and has a circular circumference,
   wherein the second outer diameter of the second exhaust pipe is greater than the outer diameter of the exhaust pipe, and the exhaust pipe is disposed within an internal space of the second exhaust pipe.

16. The assembly of claim 15, wherein an inner diameter of the second exhaust pipe is greater than the outer diameter of the accessory.

17. A method for using the assembly of claim 1.

18. A method of assembling the assembly of claim 1.

19. The assembly of claim 1, wherein the outer diameter of the accessory and the outer diameter of the exhaust pipe are in a ratio in a range of about 1.0000 to about 1.5000.

20. The assembly of claim 19, wherein the ratio is in a range of about 1.0040 and about 1.4290.

21. The assembly of claim 20, wherein the ratio is in a range of about 1.0040 and about 1.195.

* * * * *